United States Patent
Silva Santos et al.

(10) Patent No.: US 8,883,239 B2
(45) Date of Patent: Nov. 11, 2014

(54) CLARIFICATION AND SELECTIVE BINDING OF PHENOLIC COMPOUNDS FROM LIQUID FOODSTUFF OR BEVERAGES USING SMART POLYMERS

(71) Applicants: Universidad de Talca, Talca (CL); Fundación Fraunhofer Chile Research, Santiago (CL)

(72) Inventors: Leonardo Silva Santos, Talca (CL); John Amalraj, Talca (CL); Victor Felipe Laurie Gleisner, Talca (CL)

(73) Assignees: Universidad de Talca (CL); Fundacion Fraunhofer Chile Research (CL)

( * ) Notice: Subject to any disclaimer, the term of this patent is extended or adjusted under 35 U.S.C. 154(b) by 0 days.

(21) Appl. No.: 13/777,989

(22) Filed: Feb. 26, 2013

(65) Prior Publication Data

US 2014/0242242 A1 Aug. 28, 2014

(51) Int. Cl.
*A23J 1/09* (2006.01)
*A23L 2/80* (2006.01)
*C12H 1/056* (2006.01)
*A23L 1/015* (2006.01)

(52) U.S. Cl.
CPC .................. *A23L 1/0156* (2013.01); *A23L 2/80* (2013.01); *C12H 1/0424* (2013.01)
USPC .................. 426/490; 426/11; 426/13; 426/15; 426/16

(58) Field of Classification Search
USPC ........................................................ 426/490
See application file for complete search history.

(56) References Cited

U.S. PATENT DOCUMENTS

| | | | |
|---|---|---|---|
| 2003/0124233 | A1 | 7/2003 | Gomez et al. |
| 2004/0101621 | A1 | 5/2004 | Adams et al. |
| 2006/0127350 | A1 | 6/2006 | Heegaard et al. |
| 2009/0035440 | A1 | 2/2009 | Velikov |
| 2009/0291171 | A1 | 11/2009 | Bellamy et al. |

FOREIGN PATENT DOCUMENTS

| | | |
|---|---|---|
| EP | 1 567 195 | 10/2010 |
| FR | 2 907 462 | 4/2008 |
| WO | WO 2004/047869 | 6/2004 |
| WO | WO 2009/016018 | 2/2009 |
| WO | 2012/104637 A1 | 8/2012 |

OTHER PUBLICATIONS

International Search Report for International Application No. PCT/IB2014/59208 mailed Aug. 22, 2014 (2 pages).
International Written Opinion for International Application No. PCT/IB2014/59208 mailed Aug. 22, 2014 (5 pages).
Meng et al. "Perparation of Fe3O4@C@PANI magnetic microspheres for the extraction and analysis of phenolic compounds in water samples by gass chromatography-mass spectrometry." J. of Chromatography A. (2011) 1218:2841-2847.
Belaib et al. "Elimination of Phenol by Adsorption onto Mineral/Polyaniline composite solid support." Energy Procedia. (2012) 18:1254-1260.

*Primary Examiner* — Patricia George
(74) *Attorney, Agent, or Firm* — Merchant & Gould P.C.

(57) ABSTRACT

The present invention corresponds to a method for the removal of unwanted phenolic compounds from foodstuffs, more particularly beverages. The method comprising contacting a selected polymer with the foodstuff. In a particular embodiment, the polymers are selected among polyaniline (PANI), polyaniline emeraldine base (PANI-EB) and polyaniline emeraldine salt (PANI-ES) polymers, or the polymers are selected among polyamidoamine (PAMAM) dendrimers functionalized with polyaniline (PANI), polyaniline emeraldine base (PANI-EB) and polyaniline emeraldine salt (PANI-ES) polymers.

15 Claims, 14 Drawing Sheets

(A)

(B)

CLARIFICATION AND SELECTIVE BINDING OF PHENOLIC COMPOUNDS FROM LIQUID FOODSTUFF OR BEVERAGES USING SMART POLYMERS

TECHNICAL FIELD

The present application is related to the field of food processing, in particular, to clarification of liquid foodstuff or beverages. The invention corresponds to a composition, mainly comprising a specifically designed polymer, for selective adsorption of determined compounds. More specifically, the invention is directed to clarification of liquid foodstuff or beverages, by application of the composition comprising the specifically designed polymer for removal of specific phenolic compounds.

BACKGROUND OF THE INVENTION

Fining agents are substances commonly used in liquid foodstuff or beverage production for clarification, stability, and improvement of sensory characteristics. These agents help provide clarity, avoid the formation of amorphous precipitates (e.g. macromolecules such as protein, sugars, tannins) and crystals (e.g. potassium or calcium tartrates), and are used to make corrections to the color and flavor of the products treated.

Some of the clarifying agents most typically used in beverage production include substances such as bentonite, protein-based materials such as gelatin, casein, and albumin, activated carbon, and synthetic products like polyvinylpolypyrrolidone (PVPP).

PVPP is a clarifying agent produced by the polymerization N-vinyl-2-pyrrolidone in alkaline media. For example, in white wine production PVPP is used to remove the brown color formed by effect of enzymatic or chemical oxidation, as well as to prevent the formation of pink color due to an unknown reaction that has been linked to unstable phenolic intermediates. PVPP is a synthetic product capable of non-selective adsorption of the undesired substances, mainly oxidizable phenolic compounds. Depending on the application and market restriction, PVPP additions can range between 0.1 to 0.8 g/L.

Due to their limited selectivity, some of the negative consequences of the use of fining agents are related to their capacity to remove compounds which are responsible for some of the organoleptic features of the product (e.g. aromas), thus reducing the quality of the products.

In this document, the description of the scope of the invention is usually exemplified by references to the wine industry, nevertheless, this must not be understood as a limitation of the invention to said industry, since the compounds, compositions and methods of the present invention can be applied to a wide variety of liquid foodstuffs or beverages. Therefore, the terms liquid foodstuff or beverage must be understood in their widest meaning, such as for example, but not limited to, fruit juices, plant juices or extracts, fermented beverages, alcoholic fermented beverages, such as wine, beer, cider, sparkling wine, ale, rye beer, chicha, sake, pulque; or distilled alcoholic beverages such as whisky, whiskey, vodka, korn, brandy, cognac, vermouth, pisco, armagnac, branntwein, singani, arak, ouzo, pastis, sambuca, grappa, orujo, aguardiente, ron, cachaça, tequila, mezcal, among many other liquid foodstuffs or beverages containing phenolic compounds which, depending on the requirements of the industry or the customer, should be removed from the liquid foodstuff or beverage.

For a long time the scientific and technical progress in the wine industry has been centered mostly on efforts to stabilize wine and thus avoid the precipitates. The existence of precipitates reflects in the quality and standard of the wine. Indeed, it is well-known that customers finding precipitates usually return a wine product to the manufacturer.

In general, the existence of deposits of crystals and/or colorant matter in the wines is not acceptable regardless of the age of the wine; the demand is for clarity. Hence, clarification and stabilization of wines are performed to avoid any defects in clarity or any physical-chemical or microbiological disequilibrium.

Clarification is usually facilitated by the use of mineral products, such as bentonite, organic products, such as gelatin and egg whites and blood albumins, and also synthetic materials, such as polyvinylpolypyrrolidone (PVPP), a product specifically developed to this end.

Silicate suspensions and enological tannins also take part in the clarification, although they are not considered as clarifying agents in their own right but as aids to the process, especially when performed with mineral or organic products.

Other substances, such as charcoal, have reduced clarifying power but give a better color, thus improving the appearance of the product.

Filtration is also considered to be a stabilization operation because it eliminates those substances and microbial agents that are responsible for precipitates. The most common method of performing filtration is through the use of nylon filters or other materials with a specific pore size.

The main disadvantage of using PVPP and the other agents is their poor selectivity. There is a chance to eliminate the vital compounds from the product, which will affect its quality. Furthermore, PVPP works optimally at a defined pH range.

A new area being developed is that of smart polymers that have many advantages and applications. Particularly, these smart polymers can be used to trap phenolic compounds with high selectivity according to the requirements of a particular industry. Other advantages that these polymers have is their easy synthesis and characterization in addition to being environmentally and biologically benign, easy to separate from the final product and a selectivity that can be altered by changing the functional group of the polymers.

One way to address the above problems is through the detection, quantification and removal of unwanted substances using smart polymers. The use of branched polymers as opposed to the traditional linear ones, on the removal of unwanted substances, could largely improve the efficiency and specificity of practices where traditional methods are employed.

The procedure employed for the development of these smart polymers consisted on the following: The identification of target polyphenols common to most fruit-based beverages, the synthesis and chemical characterization of an array of smart polymers based on their potential binding capabilities against phenolic compounds, the screening of the interaction between the polymers and selected phenolic compounds via liquid chromatography and UV-Vis spectrometry, and testing of the polymers in real food matrices (e.g. wine).

Thus, the problem to be solved by the present invention is removing selectively unwanted compounds from a liquid foodstuff or beverage, with a high yield, and a broad working pH range, and the solution proposed in the present invention is providing compounds or compositions for selective adsorption of compounds which affect negatively the quality of a liquid foodstuff or beverage.

The present invention is directed to compounds which have shown that adsorb selectively specific phenolic compounds which are responsible for crystallization in beverages, or produce haze.

In order to solve the proposed technical problem, different polymers were designed, tested, and screened which would have the higher selectivity and yield for a set of identified specific compounds. These polymers resulted to be specific forms of polyaniline, and polyamidoamine polymers functionalized with polyaniline polymers.

Polyaniline is a conducting polymer formed by combination of aniline monomers. The polymerized aniline monomers can be found in different oxidation states, where the fully reduced state is known as leucoemeraldine, while the fully oxidized state is known as (per)nigraniline. The intermediate state, emeraldine, has two forms, one the emeraldine base (PANI-EB) is the neutral form, and emeraldine salt PANI-ES) is the protonated form. The use of polyaniline polymers has been primarily directed to semiconductive devices, or electric devices; its use in batteries or in the conversion of chemical energy to electrical energy, whereas the application of polyaniline polymers in the food industry has been limited to the use of the compound as a sensor, for example for evaluating the toxicity of a food product.

Other part of the molecules considered in the present invention are dendrimers. The dendrimers correspond to a repetitively branched molecule based on polymers. A dendrimer is usually symmetric around its core and might adopt a spherical shape. There are high and low molecular weight dendrimers, depending on the amount and length of branches. These molecules are typically used as a core for a larger molecule which would have specific features and functions depending on the functional groups that can be added to the surface of a dendrimer.

Dendrimers can also be classified in terms of its generation. The generation corresponds to the number of repeated branching cycles that are performed during its synthesis. The higher the generation of a dendrimer, the higher the number of exposed functional groups in its surface.

In particular, the present invention is directed to polyamidoamine (PAMAM) dendrimers. The core of PAMAM is a diamine (commonly ethylenediamine), which is reacted with methyl acrylate, and then another ethylenediamine to make the generation-0 (G-0) PAMAM. Further cycles of reactions will then render higher PAMAM generations.

The use of PAMAM dendrimers has seen a wide variety of applications. For example, PAMAM polymers have been used in pharmaceutical compositions as carriers, as substrate for analyses or detection of compounds, associated with nucleic acids for therapeutic purposes,

PRIOR ART

The food industry has a long history using different compositions with the purpose of helping with the clarification of foodstuffs. In particular, in beverages, more specifically in the wine industry, the use of different compounds is well known in the art, nevertheless, up to date, and to the best of the knowledge of the inventors, no composition is as selective as the compositions of the present invention.

For Example, the document FR2907462 describes a procedure for reduction of concentration of unwanted compounds in wine, wherein the beverage is contacted with an absorbent medium composed of nanoporous particles. This document describes specifically volatile phenolic compounds as unwanted, and the particles are made of a reticulate non-functional polyestirene. In this case, the compounds used achieve, depending on the volatile compound analyzed, from around 30% elimination of the compound, up to 94%. Nevertheless, the yield of adsorption of specific phenolic compounds is higher when using the compositions of the present invention, wherein the lower amount of phenolic compounds removed from the beverage is over 90%.

Other document, US2003124233, describes the use of highly reticulated "pop-corn" polymers. The use of these polymers is described in the filtration of different beverages, describing as a specific problem the separation of phenolic compounds without altering the quality or flavor of the filtered beverage. The compounds are made of a part of a hydrophilic agent, more preferentially N-vinyllactam or N-vinylamine, a part of a reticulate bifunctional component, and a part of at least one monomer which can be polymerized by free radicals. Nevertheless, the higher reduction of a particular phenolic compound reported, catechin, is a little over 20%. Nevertheless, the removal percentage using some of the compounds according to the present invention, allow removal of at least 79% for catechin.

More particularly, EP1567195 describes the use of a dendrimer as a conjugate with a protein solubilizing substance. This document is directed to the solubilisation of protein aggregates, which could lead to diseases, such as for example prion-related diseases, Alzheimer's disease. In a particular application, the dendrimer conjugate is applied to a food preparation, wherein a malign protein aggregate might be present. Nevertheless, there is no reference to the use of PAMAM dendrimers used in the food industry for the adsorption and removal of phenolic compounds.

WO2009016018 describes compositions comprising polyphenols, more particularly, this document describes the use of polymers comprising amine groups for providing improved compositions comprising polyphenols. WO2009016018 describes different types of polymers for different applications, more particularly this application is directed to mask the bitterness in food products that are caused by the presence of some specific polyphenols. Although this application mentions polyaniline among the potential polymers comprising amine groups, the function of the polymer comprising an amine group is not adsorbing the phenolic compounds for their removal from the beverage, but the application is limited to only masking the bitter taste in food compositions, by forming polymer-polyphenol complexes.

As can be seen from the prior art, the use of polyaniline polymers or polyamidoamine dendrimers functionalized with polyaniline polymers for removing selectively unwanted compounds from a beverage, with a high yield, and a broad working pH range, has not previously addressed, and the alternative polymers previously used to this end, have lower yields and lower selectivity than the compounds described in the present invention.

Figure 1:
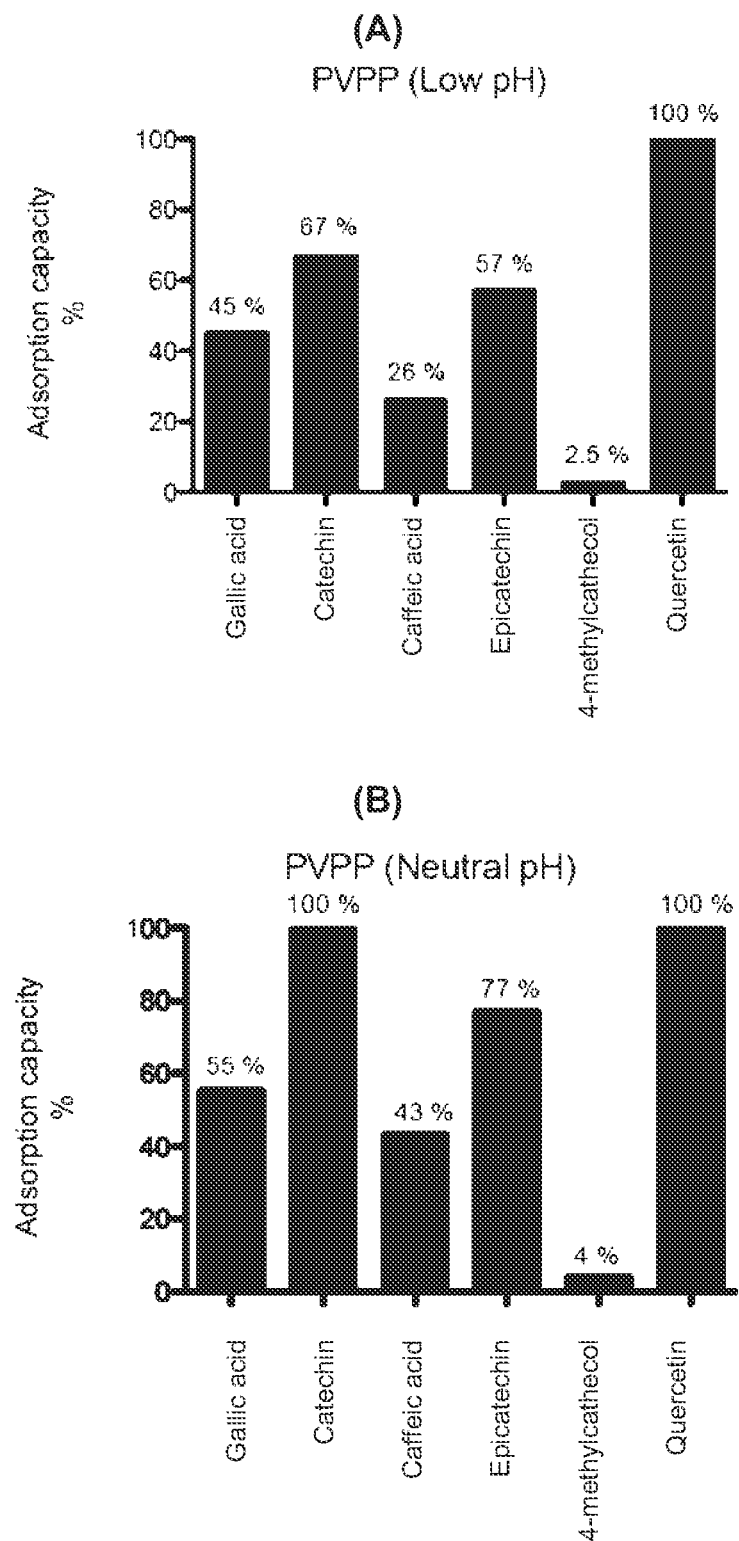
FIG. 1. Adsorption capacity of the phenolic compounds using Polyvinyl pyrrolidone (PVPP) at low pH (A) and neutral pH (B).
Figure 2:
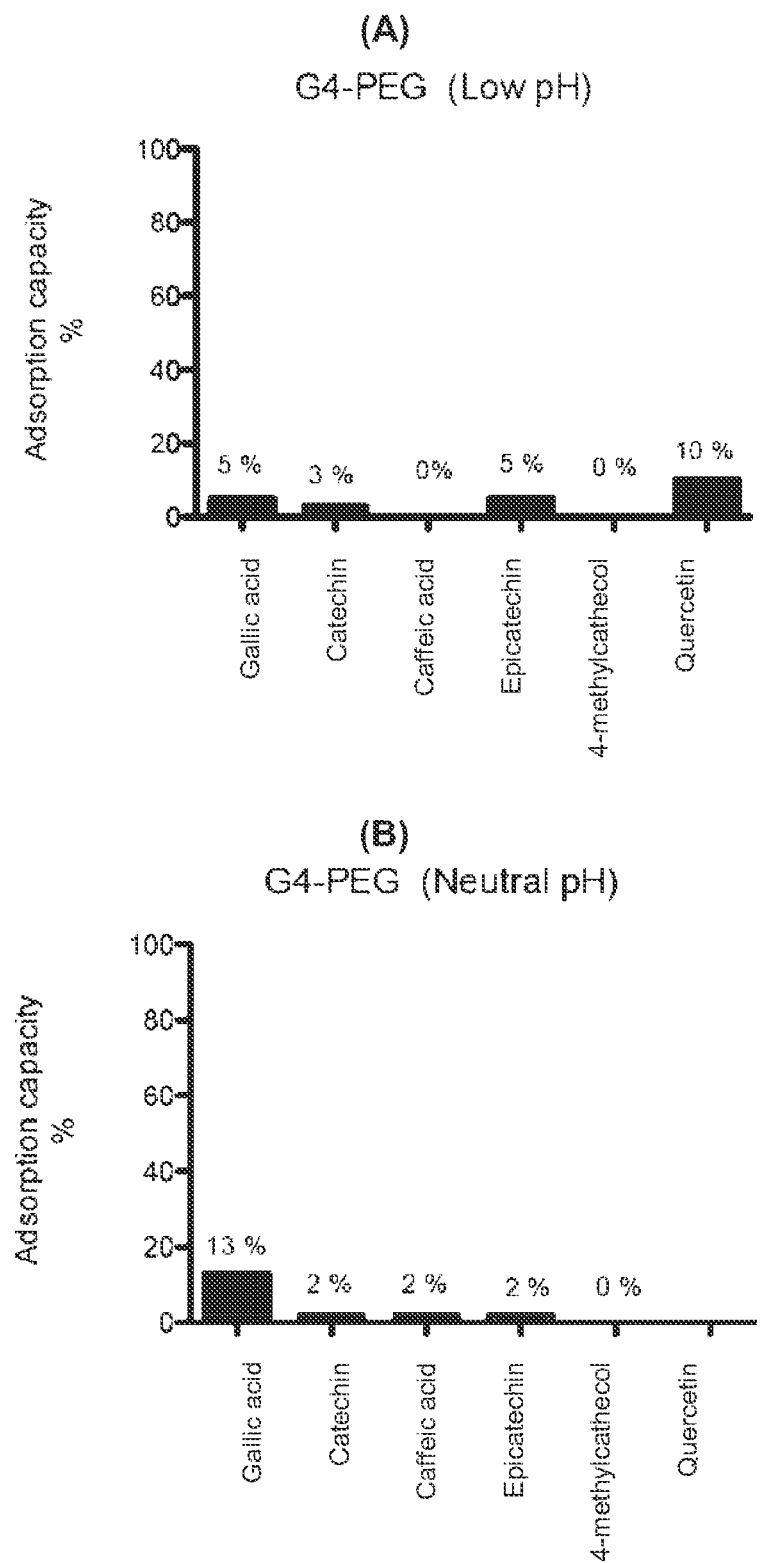
FIG. 2. Adsorption capacity of the phenolic compounds using PAMAM G4-polyethylene glycol (G4-PEG) at low pH (A) and neutral pH (B).
Figure 3:
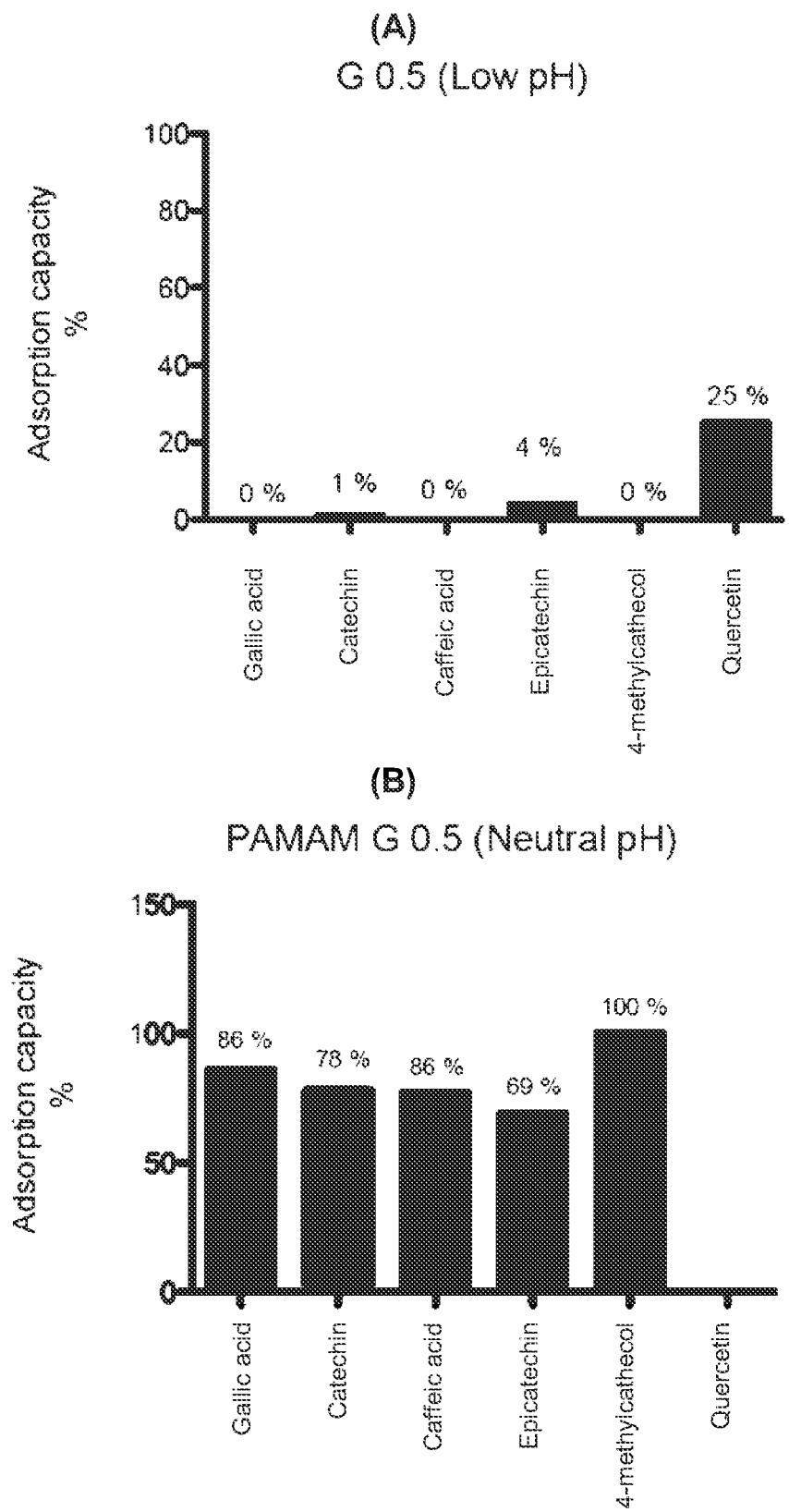
FIG. 3. Adsorption capacity of the phenolic compounds using PAMAM-G 0.5 at low pH (A) and neutral pH (B).
Figure 4:
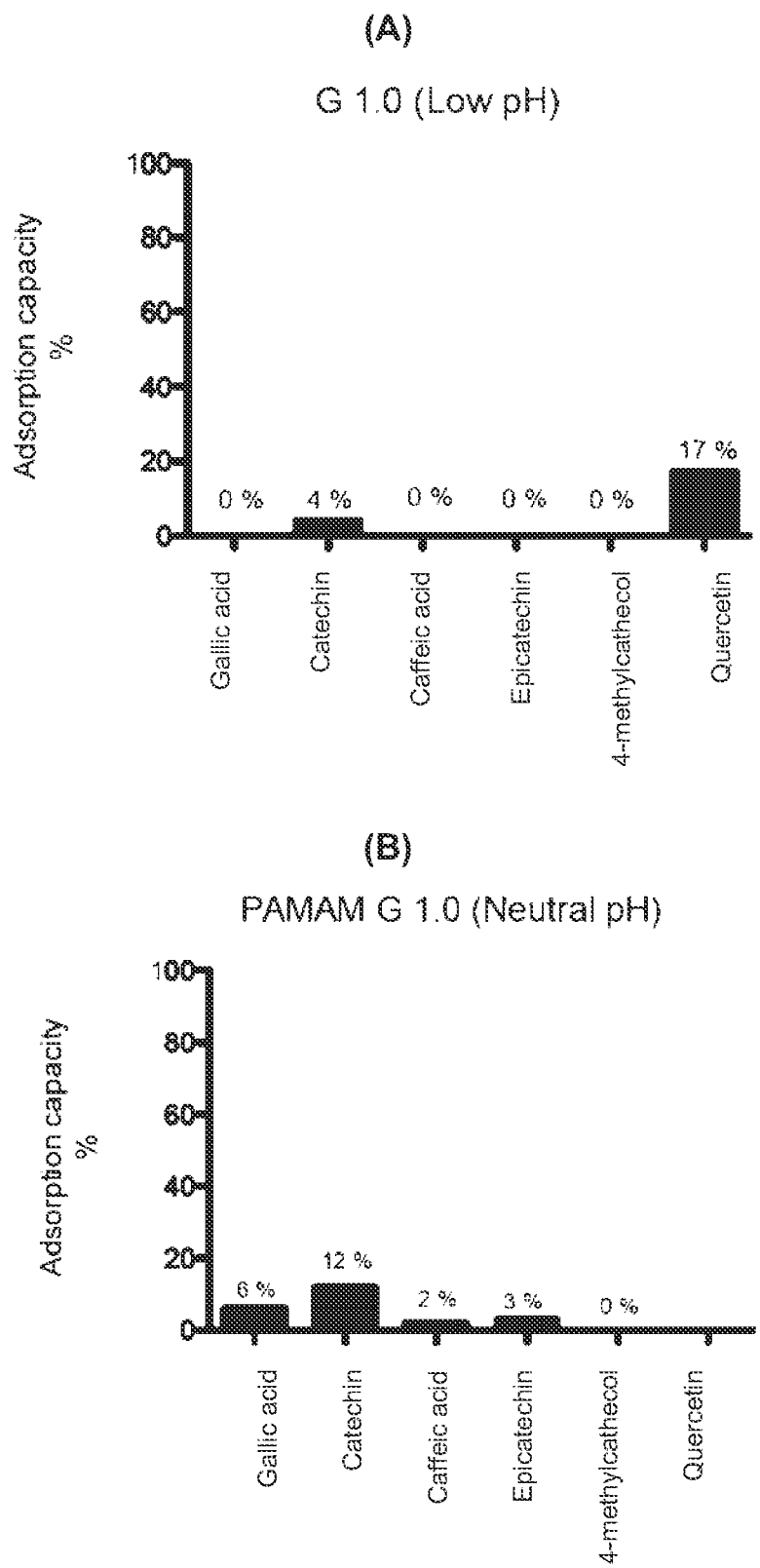
FIG. 4. Adsorption capacity of the phenolic compounds using PAMAM-G 1.0 at low pH (A) and neutral pH (B).
Figure 5:
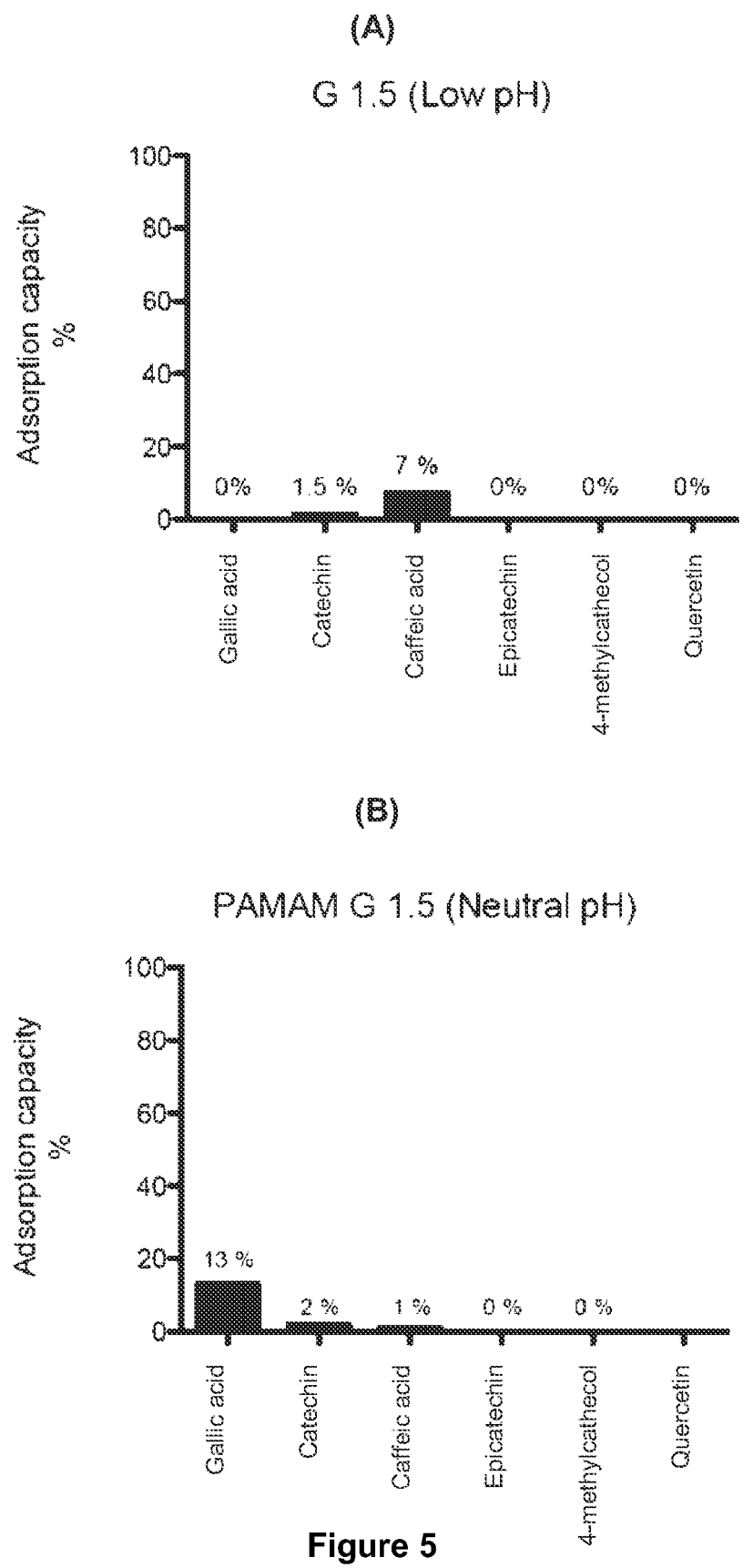
FIG. 5. Adsorption capacity of the phenolic compounds using PAMAM-G 1.5 at low pH (A) and neutral pH (B).
Figure 6:
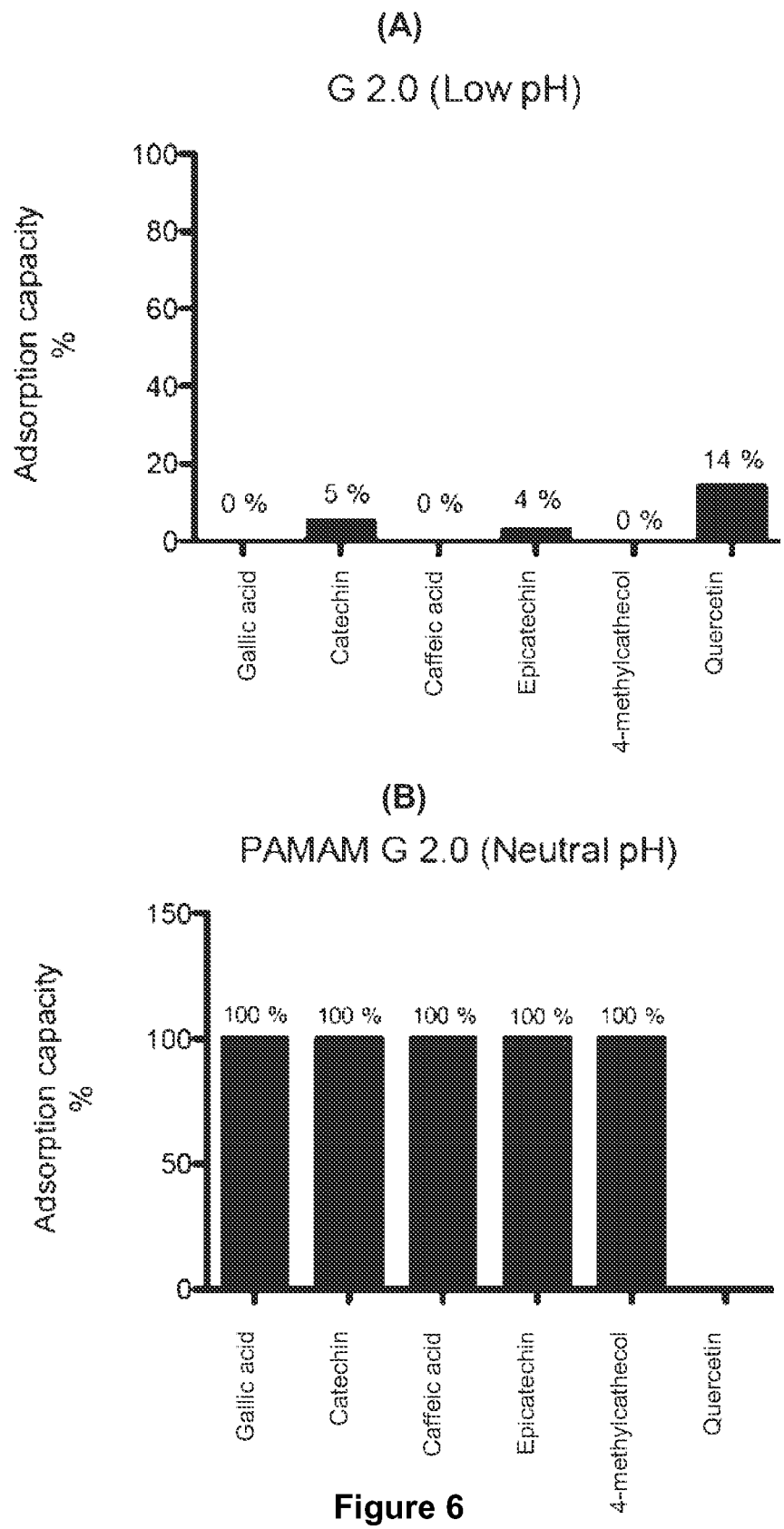
FIG. 6. Adsorption capacity of the phenolic compounds using PAMAM-G 2.0 at low pH (A) and neutral pH (B).
Figure 7:
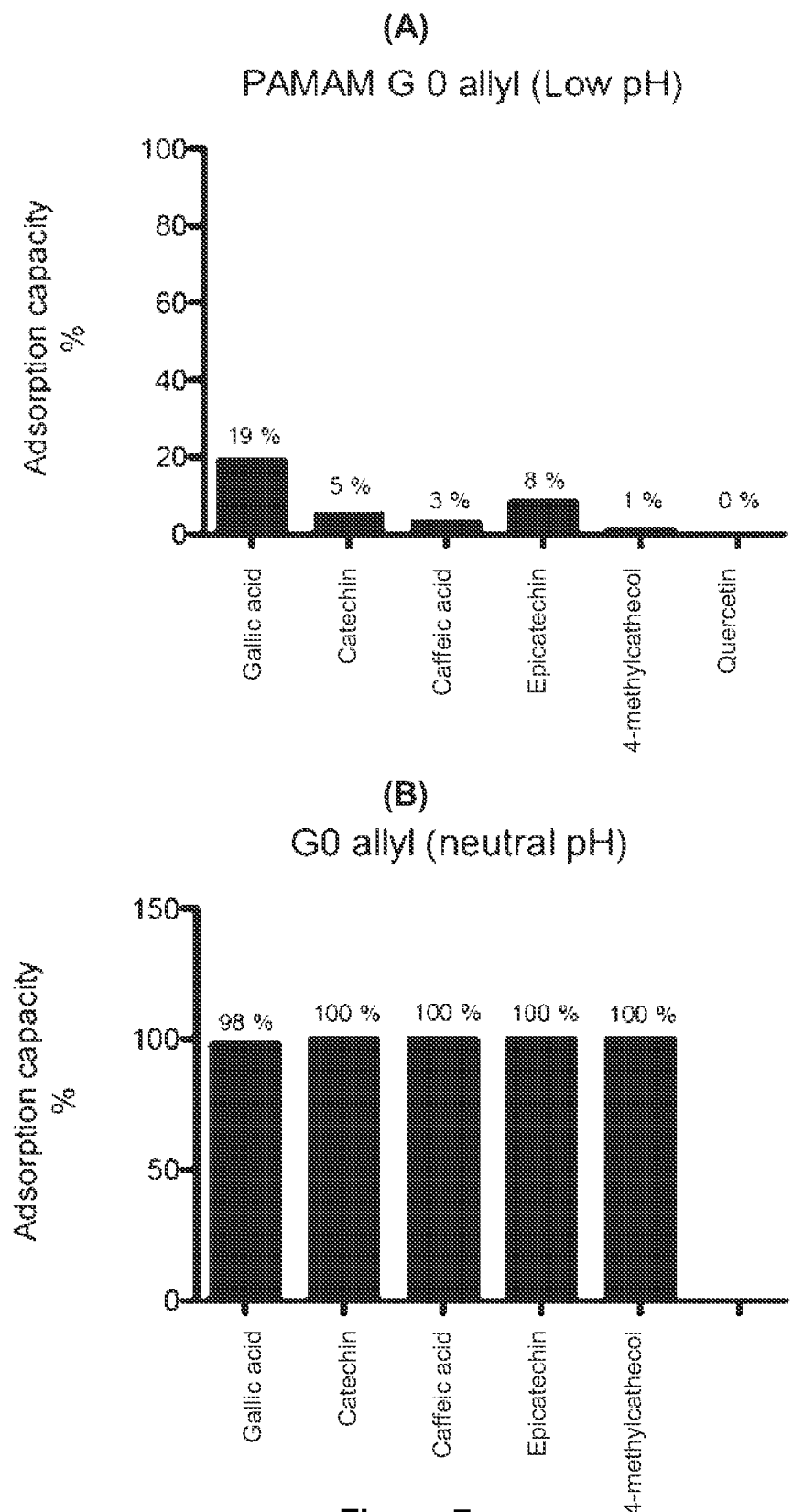
FIG. 7. Adsorption capacity of the phenolic compounds using PAMAM-G0 allyl at low pH (A) and neutral pH (B).
Figure 8:
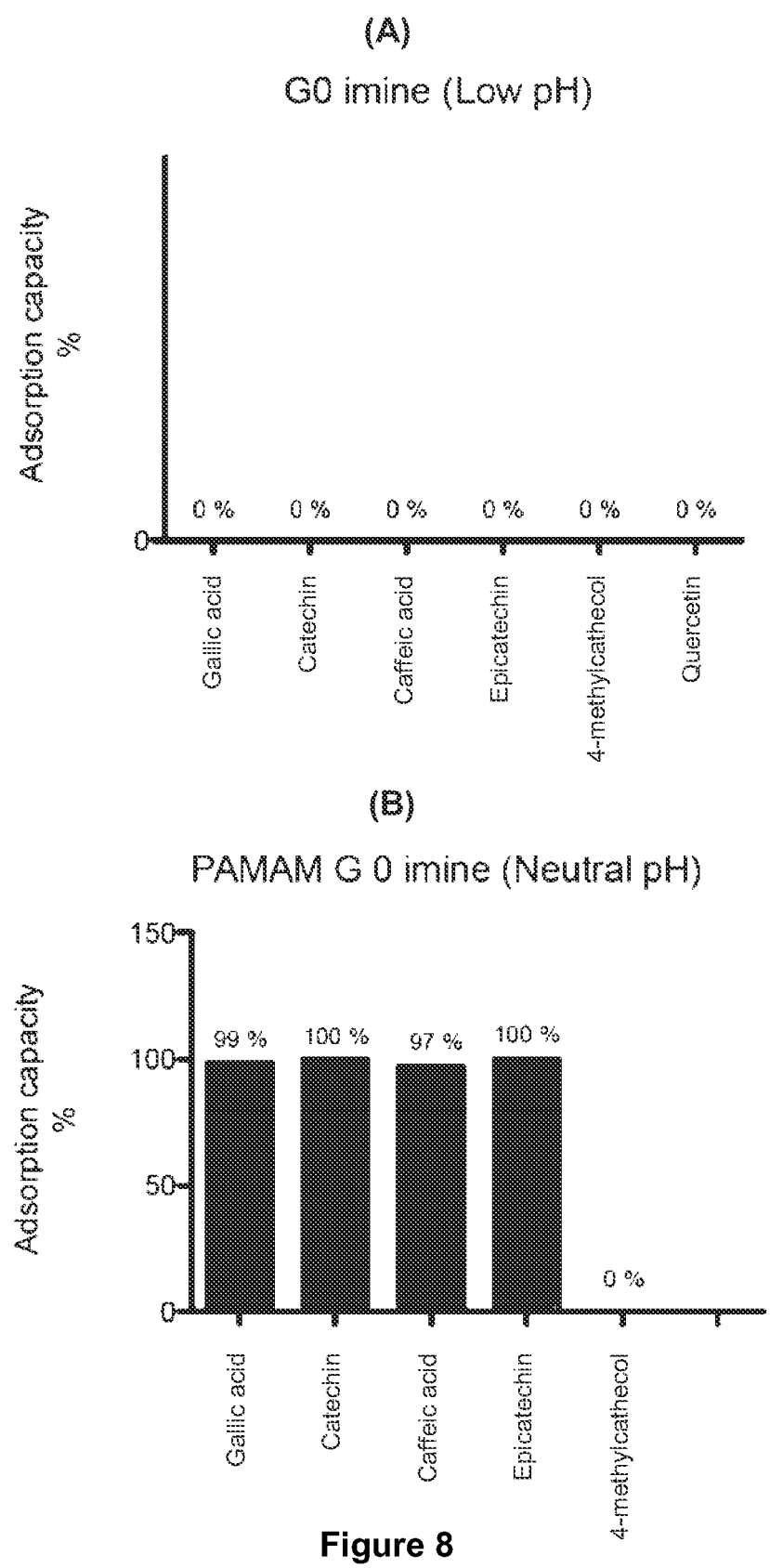
FIG. 8. Adsorption capacity of the phenolic compounds using PAMAM-G 0 imine at low pH (A) and neutral pH (B).
Figure 9:
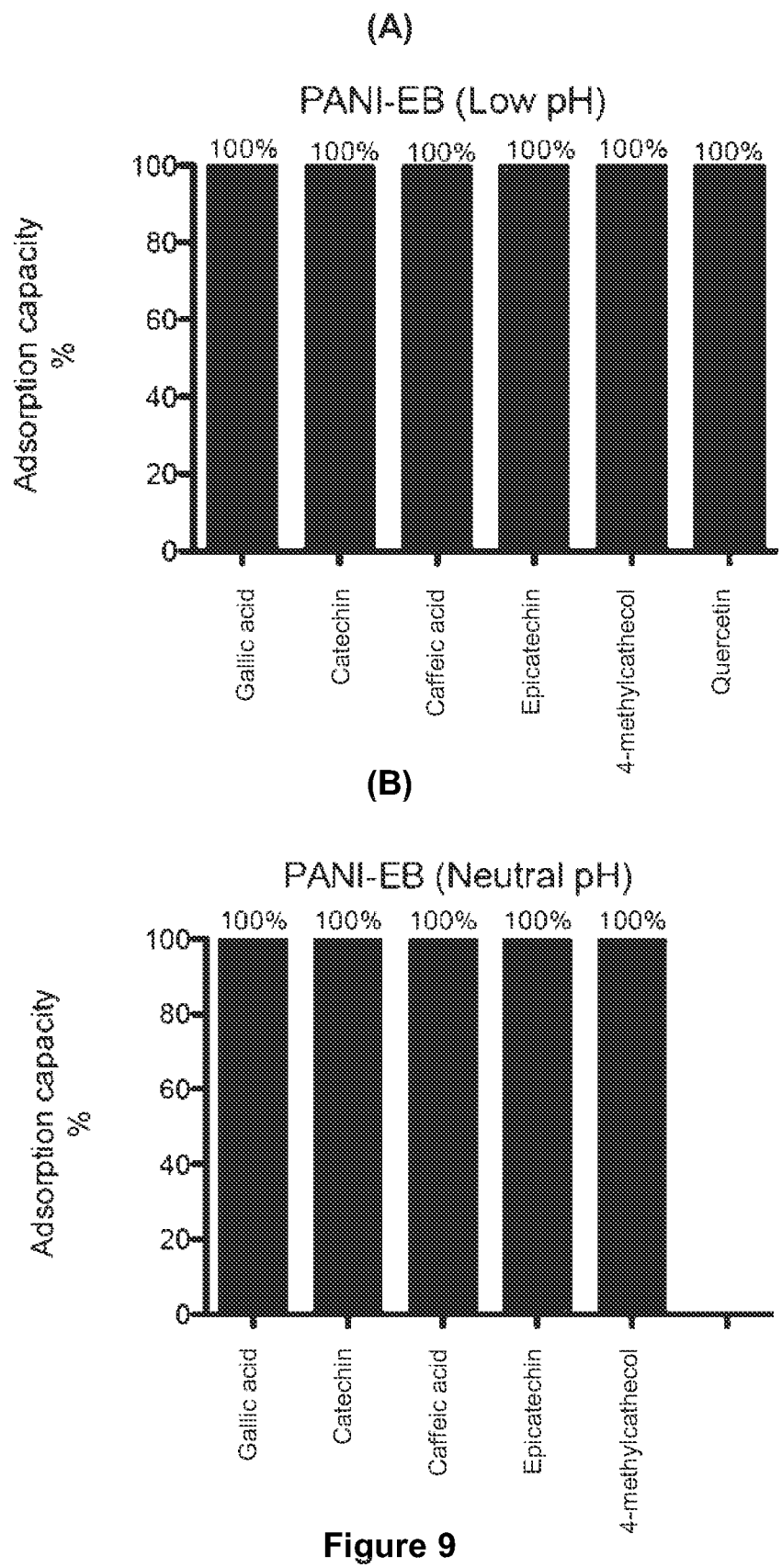
FIG. 9. Adsorption capacity of the phenolic compounds using Polyaniline emeraldine base (PANI-EB) at low pH (A) and neutral pH (B).
Figure 10:
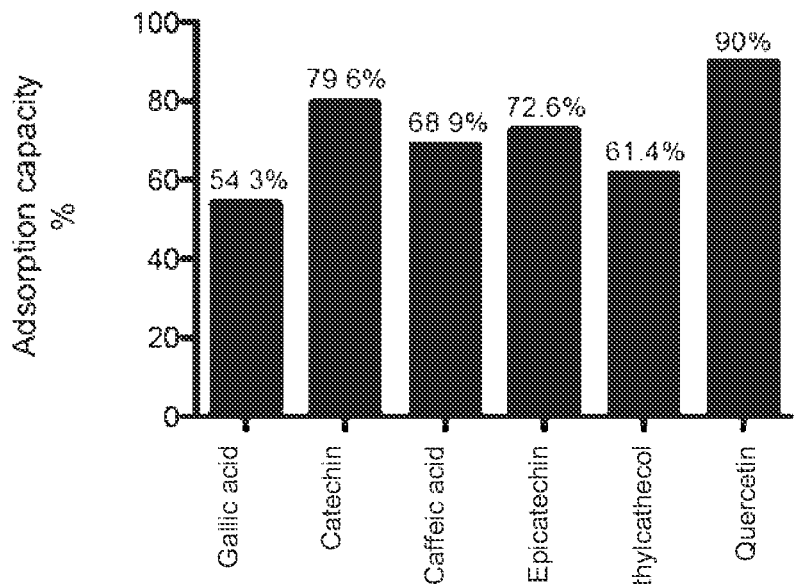
FIG. 10. Adsorption capacity of the phenolic compounds using Polyaniline emeraldine salt (PANI-EB) at low pH (A) and neutral pH (B).
Figure 10:
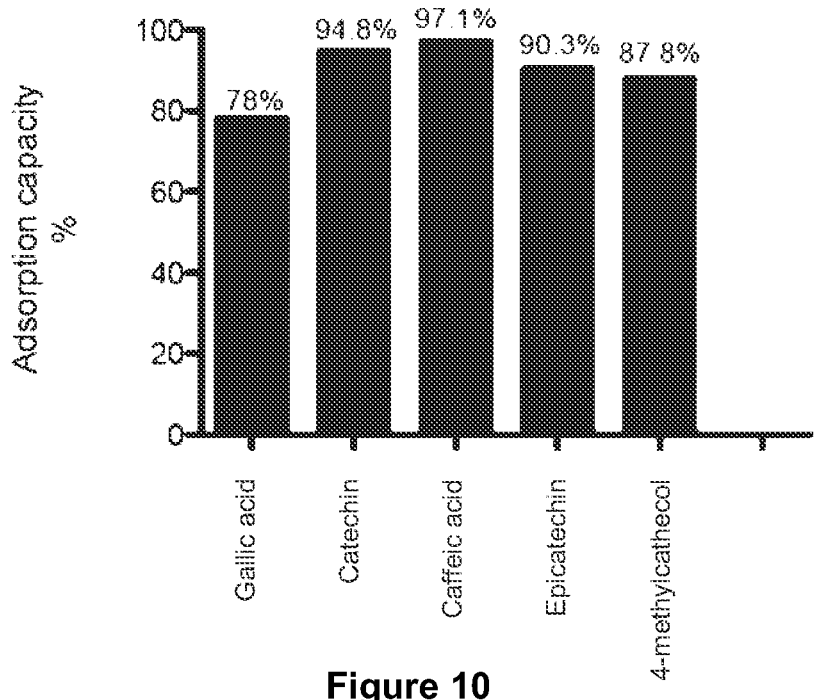

In all figures, the tests were performed at pH 3.5 (low pH) and 6.5 (neutral pH).

SUMMARY

The present invention is related to the use of compositions comprising specific polymers in food processing. More particularly, the compounds and/or compositions of the invention are useful in processing liquid foodstuffs or beverages, by selectively removing unwanted components. In a more particular case, the unwanted components correspond to phenolic compounds.

The compounds of the invention correspond to hyperbranched polyaniline (PANI) dendrimers, more particularly, 2 specific polyaniline polymer forms are considered part of the present invention: polyaniline emeraldine base (PANI-EB) and polyaniline emeraldine salt (PANI-ES).

The invention also comprises polyamidoamine (PAMAM) polymers functionalized with polyaniline (PANI) polymers.

DETAILED DESCRIPTION OF THE INVENTION

It has been found that PANI polymers, either PANI-EB or PANI-ES have interesting adsorption properties, specifically for determined phenolic compounds.

The present invention corresponds to a method or the use of PANI polymers, either PANI-EB or PANI-ES in the treatment of foodstuffs, more particularly for removing specific compounds from liquid foodstuff or beverages.

In a more specific embodiment, the use of PANI polymers in the method of the present invention is directed to the removal of specific phenolic compounds from fruit juices, plant juices or extracts, from alcoholic beverages such as wine or beer, and from distilled alcoholic beverages, or spirits.

In a more specific embodiment, the PANI polymers of the invention are selected in a range of molecular weight from 7 kDa to 150 kDa, more preferentially from 15 kDa to 70 kDa.

Previously, and up to the date of filing of this application, and up to the best of the knowledge of the inventors, there is no published report indicating the use of PANI polymers for phenolic compound removal from liquid foodstuffs or beverages.

In a further embodiment of the present invention, functionalized polyamidoamine (PAMAM) dendrimers are considered. The PAMAM dendrimers are functionalized by adding PANI polymers to the external surface, and thus, increasing the potential contact of a single molecule of the invention with several phenolic compounds present in the foodstuff, or more preferentially a beverage.

In the present invention, PAMAM dendrimers of different generations are included in the scope of the invention. For instance, generation 0, 1, 2, 3, 4, 5, 6, 7 PAMAM are included in the scope of the invention.

In a further embodiment, PAMAM dendrimers of any considered generation are functionalized by adding PANI polymers to their surfaces. The functionalization of PAMAM dendrimers using polyaniline polymers is performed by using PAMAM polymers as capturing agents of PANIs to end the polymerization process, in the presence of a suitable persulfate salt, thus producing PAMAM-(PANI)n polymers.

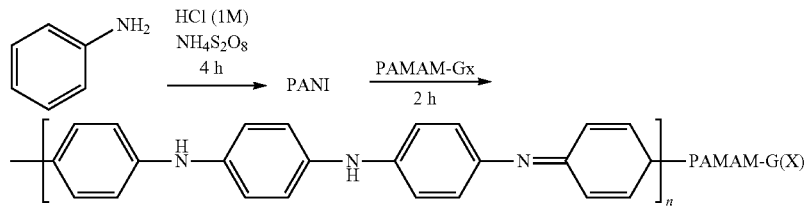

The present invention, as previously indicated, is directed to the use of PANI polymers or PAMAM-PANI polymers in the food industry, more specifically in the clarification of beverages, more particularly alcoholic beverages.

PANI polymers, as the ones described previously, can be used in different manners to allow the removal of unwanted molecules from particular beverages.

In one embodiment of the invention, the polymers of the invention (PANI-ES, PANI-EB, PAMAM-PANI-ES and PAMAM-PANI-EB) are added directly to the beverage to be treated. The polymer is added in a ratio of 0.3 g/l to 0.7 g/l, and the beverage is agitated for a period of time between 1 and 2 hours.

After the time period is completed, the polymer of the invention is separated from the beverage using standard industrial procedures, such as for example, decantation, sedimentation, filtration, and centrifugation.

On a different embodiment, the polymers of the invention (PANI-ES, PANI-EB, PAMAM-PANI-ES and PAMAM-PANI-EB) can be immobilized in a suitable matrix, allowing their use in a continuous mode. For example, the polymers of the invention can be immobilized in the matrix of a pre-filter, allowing the removal of unwanted molecules while the beverage is being subjected to filtration.

In a further embodiment, the polymers of the invention can be immobilized or can be conjugated with magnetic particles, allowing separation of the used polymers from the beverage using by magnetic means.

In yet another embodiment, the polymers of the invention can be immobilized in particles which can be used in a cartridge allowing removal of unwanted compounds from the beverage in a continuous process.

EXAMPLES

Example 1

Synthesis of Polyaniline

Polyaniline salt was prepared by aqueous polymerization technique. In a 250 ml round bottomed flask, 70 ml of deionized water was taken and 3 ml of concentrated H2SO4 was added slowly while stirring. To this mixture, 1 ml of aniline was added and the solution was kept under constant magnetic stirrer at 0-5° C. To this solution, 30 ml aqueous solution containing ammonium persulfate (2.9 g) was added for 10-15 min. duration. The reaction was allowed to continue for 6 h at ambient condition. The precipitated polyaniline salt was filtered and washed with deionized water, methanol and acetone to remove inorganic by-products and oligomers. The polyaniline powder was dried at 60° C. till a constant weight was reached.

Example 2

Preparation of Polyaniline Base

Polyaniline salt powder (1 g), obtained from the previous example, was treated with 100 ml of aqueous sodium hydroxide solution (1M) for 8 h at ambient temperature. Polyaniline base powder was filtered and washed with excess amount of deionized water and finally with acetone and dried at 60° C. till a constant weight was reached.

Example 3

Preparation of Polyaniline PAMAM

H$_2$SO$_4$ was added slowly while stirring. To this mixture, 1 ml of aniline was added and the solution was kept under constant magnetic stirrer at 0-5° C. To this solution, 30 ml aqueous solution containing ammonium persulfate (2.9 g) was added for 10-15 min. duration. The reaction was allowed to continue for 4 h at ambient condition. Then, 0.01 mol % of PAMAM-Gx (x=0 to 5) aqueous solution was added at once in the reaction mixture. The reaction was allowed to stir for 2 h at room temperature. The precipitated (polyaniline)n-PAMAM-Gx (x=0-5 and n=4-128) salt was filtered and washed with deionized water, methanol and acetone to remove residual PAMAM and inorganic by-products and oligomers. The polyaniline-PAMAM powder was dried at 60° C. till a constant weight was reached.

Example 4

Affinity Study of Phenolic Compounds by HPLC Method

Materials and Methods
Reagents

Quercetin hydrate ≥95% (Aldrich), MW: 302.24 g/mol, 50 mg (0.1654 mmoles); (−)-Epicatechin (Sigma), MW: 290.27 g/mol, 48.01 mg, (0.1654 mmoles); 4-Methyl catechol ≥95% (Aldrich), MW: 124 g/mol, 20.5 mg (0.1654 mmoles) Gallic acid monohydrate ≥98% (Aldrich), MW: 188.14 g/mol, 31.11 mg (0.1654 mmoles); Caffeic acid (Sigma), MW: 180.16, 29.7 mg (0.1654 mmoles); (+)-Catechin hydrate ≥98% (Sigma), MW: 290.3 g/mol, 47.9 mg, (0.1654 mmoles); ethanol was supplied by Merck, Germany and MilliQ water was filters from Millipore 0.45 μm.

Samples

Total phenolic compound: Quercetin, (−)-Epicatechin, 4-Methyl catechol, Gallic acid, Caffeic acid, (+)-Catechin. Standard solutions of phenolic compounds were prepared in a mixture of ethanol: water 12% v/v (HPLC grade solvent).

Affinity Assays

The tests were performed at pH 3.0 (Low pH) and 6.5 (Neutral pH). The kinetic adsorption was performed at 3 times (0, 15 and 60 minutes). Total phenolic compound was prepared at 0.1654 mM diluted 1:6 (gallic acid, catechin, caffeic acid, epicatechin, 4-methylcatechol, quercetin) in water: 4.5% formic acid (pH 6.5) and water 12% ethanol (pH 3.5). The quercetin, was insoluble or slightly soluble in pure water, in 12% the ethanol was soluble. 4 mL of each solution were mixed with 0.012-0.028 mg of each polymer (c=0.3-0.7 g/L). The samples were mixed for 45 min at constant room temperature (25° C.) and then centrifuged at 10,000 rpm for 10 min. The concentrations of phenolic compounds in supernatants were analyzed by HPLC. The adsorption efficiency of each phenolic compound by polymers was evaluated by determining the percentage decrease in the absorbance at each specific maximum absorbance wavelength using the following equation:

$$\text{Adsorption}(\%) = \frac{A_0 - A_1}{A_0} \times 100 \qquad (1)$$

Where $A_0$ is the initial absorbance at specific wavelength and $A_1$ is the final absorbance at the same wavelength.

FIGS. 1 to 10 show different plots, as percentages of removal, for the different phenolic compounds removed with each of the evaluated polymers. From the plots, it is clearly seen that PANI-PAMAM polymers (FIGS. 9 and 10) are the best performers, with removal percentages of at least 54% more compared to PVPP, the new PANI polymers show a similar behaviour for all of the phenolic compounds evaluated, thus improving selectivity of unwanted phenolic compounds.

Furthermore, PANI-EB and PANI-ES perform better than PVPP when exposed at low pH environments, which is an extremely relevant surprising result since pH values range from 2.9 to 4.2 in wine processing, which is one of the applications of the method of the present invention.

Example 5

Evaluation of Polymers According to the Invention for Removing Phenolic Compounds from White Wine A young white wine, vintage 2012, Sauvignon Blanc, was used. The sample was unfiltered and without the addition of any fining agent. The wine sample was bottled in a clear glass bottle. The bottle was filled, covered with a synthetic cork.

To avoid the appearance of pinking upon exposure to air, the samples were treated in an inert atmosphere chamber, filled with nitrogen.

The wine oxidation was controlled. 0.3% p/v $H_2O_2$ was added to each wine sample, until 75 mg L-1 $H_2O_2$ amount. The samples were agitated on a plate shaker with a rocking motion at 20 rpm, for 15 hours.

Two assays were performed, one preventive and other remedial. In both cases, 10 mL of sample were used. Equivalent amounts of 30, 50, 70 and 100 mg of each polymer (PVPP, PANI-EB and PANI-ES) per 100 mL of wine, were added to each sample. A blank sample, and an oxidized sample without polymer were used to evaluate the preventive and/or remedial capacity of the polymers, and to obtain the index of sensivity.

In the preventive assay, the polymers were added to the samples before the oxidation process. In the remedial experiment, polymers were added to the samples immediately after oxidation, then the samples were shaked for 1 h.

Before the spectrophotometric determination, the samples were centrifugated for 5 min at 4,000 rpm, to separate the polymer from the wine. The preventive test was performed after the remedial assay. Considering the packaging conditions, the sensitivity index of the sample was determined at 500 nm, resulting in 3.9.

Preventive Assay

Figure 11:
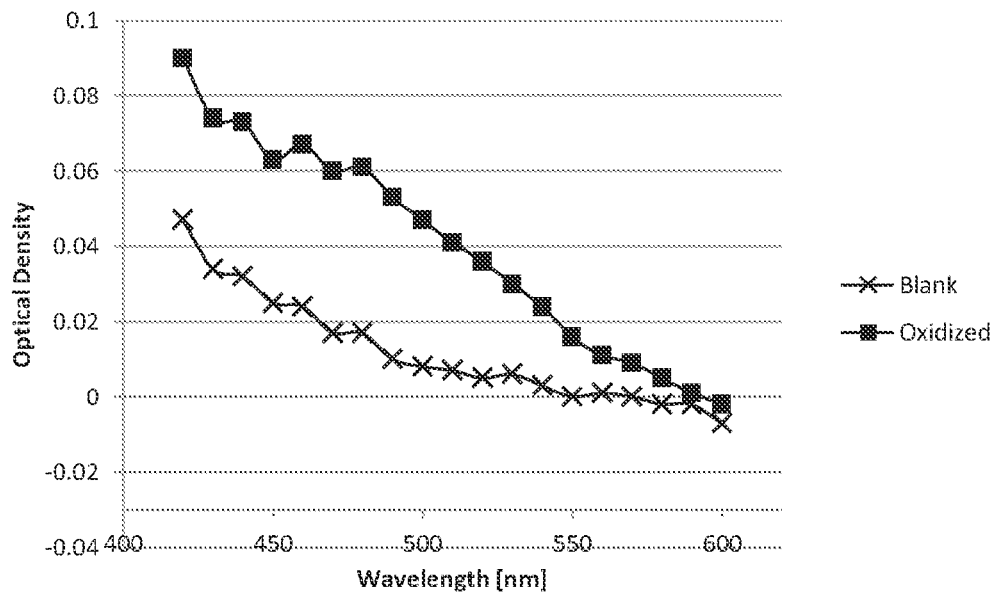
FIG. 11. Vis-spectra for blank and oxidized white wine, used in preventive assay.

Vis-spectra registered for oxidized wine and blank wine, used in a preventive assay are shown in FIG. 11. It can be seen that the oxidized wine have an increased optical density, respect the blank wine. The optical densities converge in the area of the 600 nm.

Figure 12:
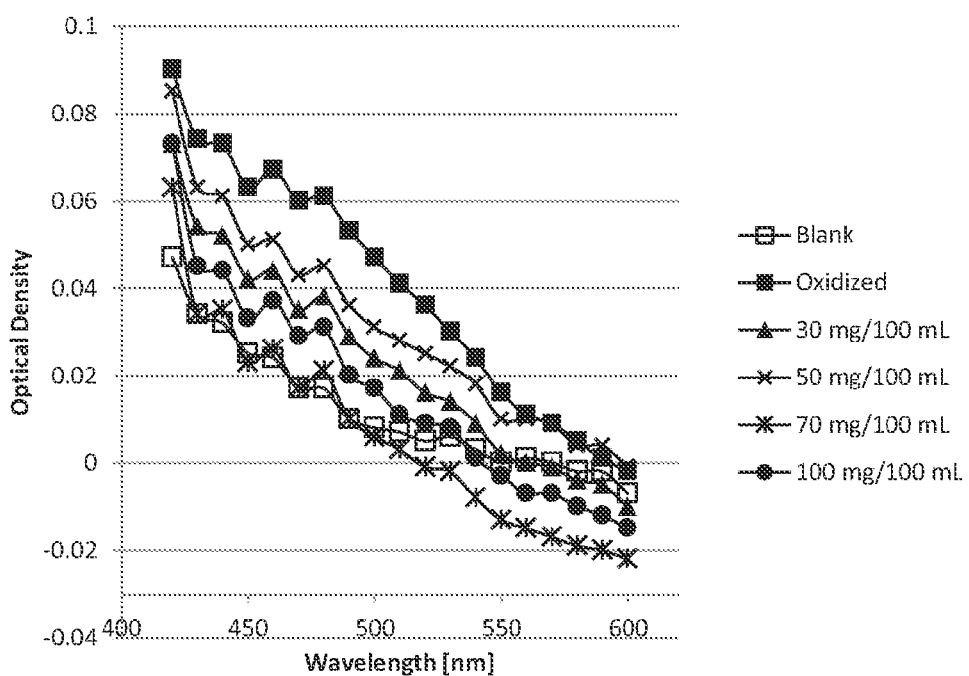
FIG. 12. Vis-spectra of preventive treatments with PVPP.

FIG. 12 shows the preventive treatments with PVPP. It can be noted that PVPP effectively prevents the occurrence of pinking in white wine at all application rates. From 70 mg/100 mL, the decrease in optical density exceeds the spectrum recorded for the blank.

Figure 13:
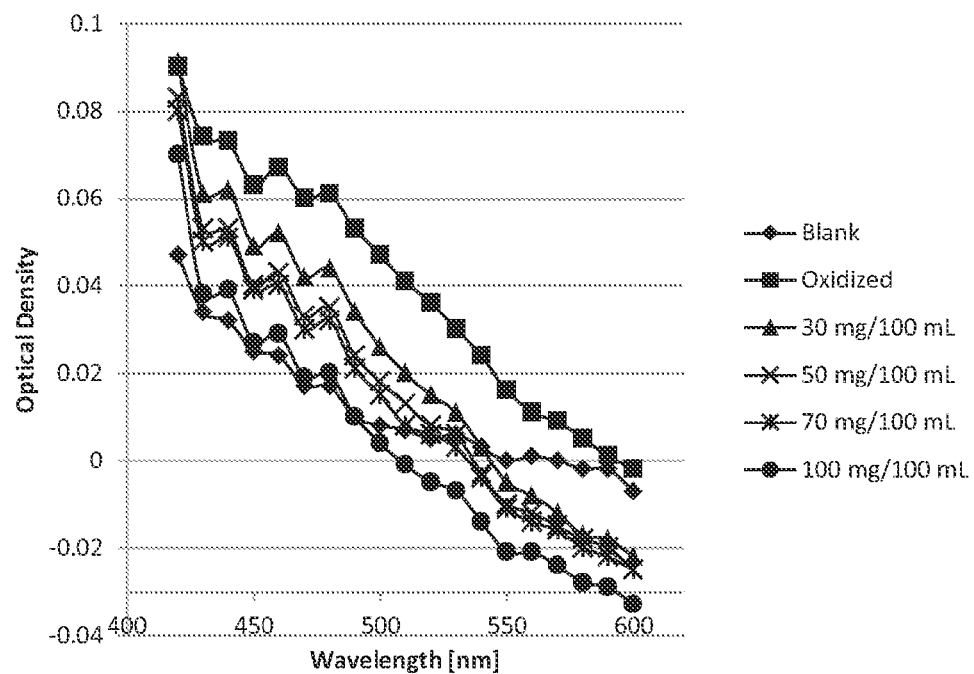
FIG. 13. Vis-spectra of preventive treatments with PANI-EB.

The preventive treatments with PANI-EB are shown in FIG. 13. This polymer has a similar behavior to PVPP.

However, the optical density presented by each treatment decreases below the optical density of the blank from 550 nm.

This behavior is observed analogously for preventive treatment with PVPP, at doses of 70 and 100 mg/100 mL of wine. Thus, the optical density decreases respect the blank more efficiently in preventive treatments with PANI-EB than treatments with PVPP.

Figure 14:
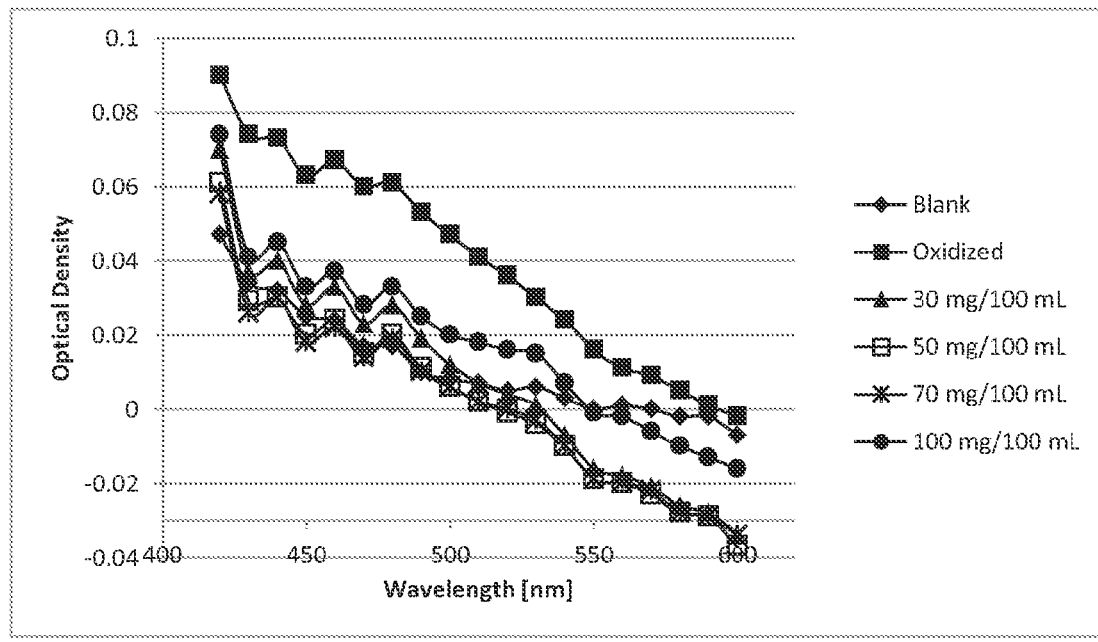
FIG. 14. Vis-spectra of preventive treatments with PANI-ES.

FIG. 14 shows the preventive treatments with PANI-ES. The behavior is analogous to that presented by PANI-EB in that the optical densities of all preventative treatments decreased from the 550 nm, becoming lower than the blank.

At lower treatment dose (50 and 70 mg/100 mL wine), optical density reaches values lower than in preventive assays with PANI-EB and PVPP.

Considering the above results, PANI-ES and PANI-EB are polymers that help the prevention of the occurrence of pinking in white wine, so much more efficiently than PVPP.

Remediative Assay

Figure 15:
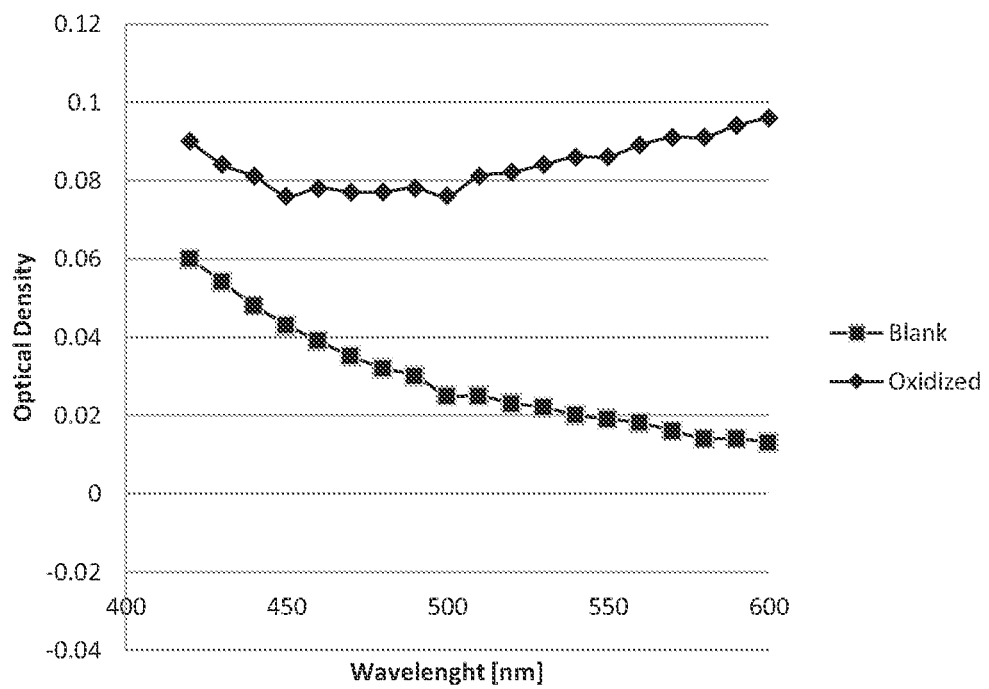
FIG. 15. Vis-spectra for blank and oxidized white wine, used in remediative assay FIG. 16. Vis-spectra of remediative treatments with PVPP.

The absorption spectra of blank and oxidized wine are shown in FIG. 15. The sensitivity index of the sample was determined at 500 nm, resulting in 5.1.

It is noted that the optical densities diverge at 600 nm. As expected, the oxidized wine presents optical densities greater than the blank wine at any wavelength.

Figure 16:
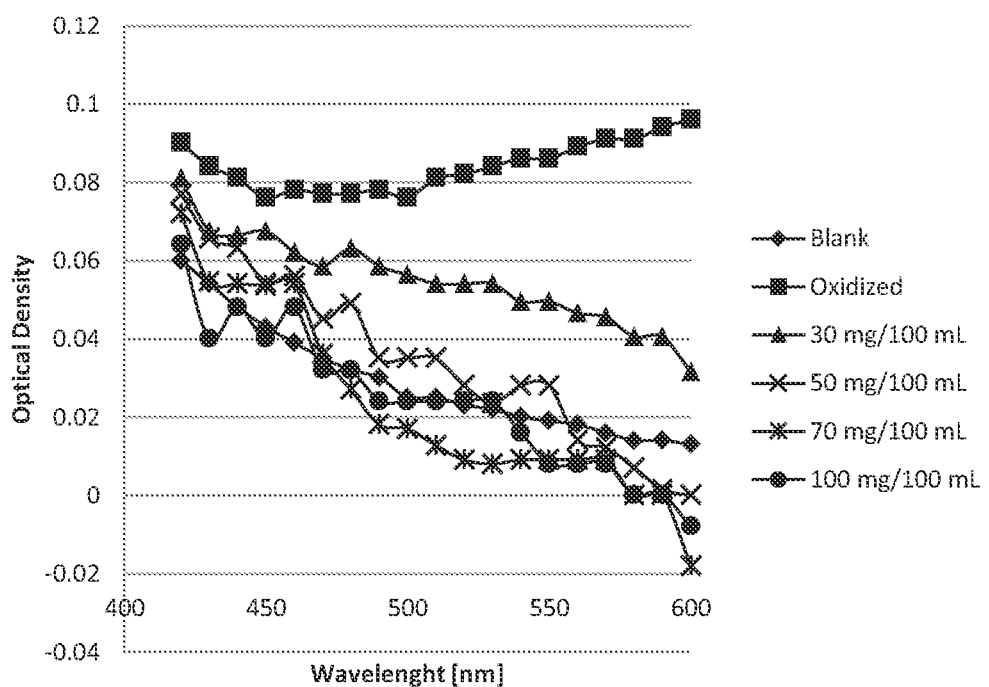

The FIG. 16 presents the remediative treatments with PVPP. As in the preventive treatment, PVPP reduces the optical density of the oxidized wine. It is noted that as the dosage PVPP increases, the absorbance of the treated sample approaches to the control wine. From 70 mg PVPP/100 mL of wine, the optical density decreases at the blank level.

Figure 17:
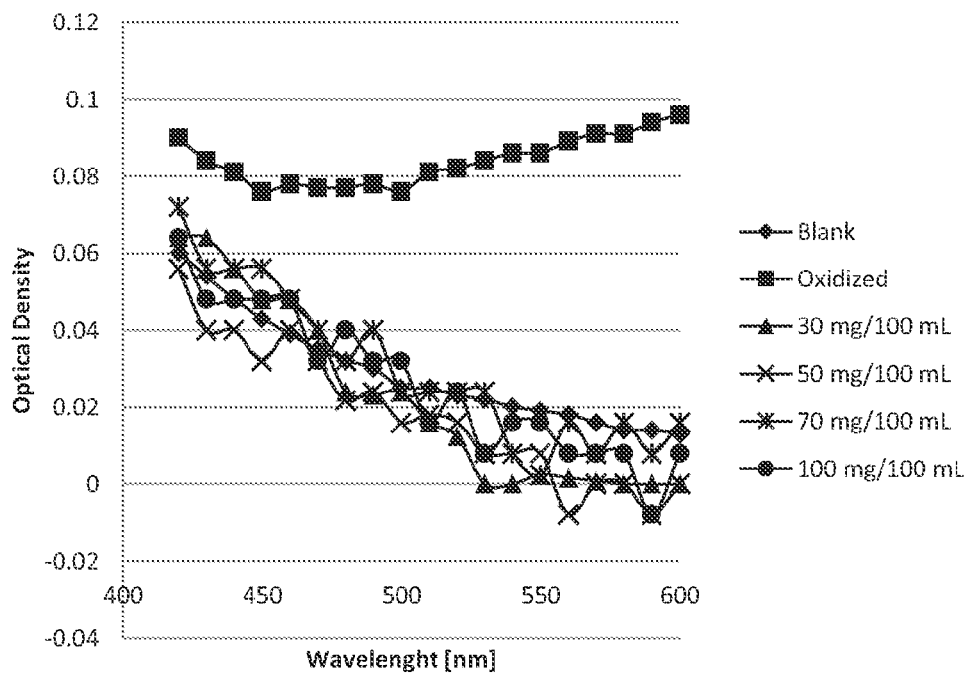
FIG. 17. Vis-spectra of remediative treatments with PANI-EB.

PANI-EB remediative treatment is shown in FIG. 17. It is observed that PANI-EB reduces the absorbance of the oxidized wine.

The behavior of remedial treatment with PANI-EB is similar to the observed in the preventive treatment. The efficiency of PANI-EB is greater than that observed in the remedial treatment with PVPP, at any dose of polymer, the absorbance decreases to levels very close to the control wine.

Figure 18:
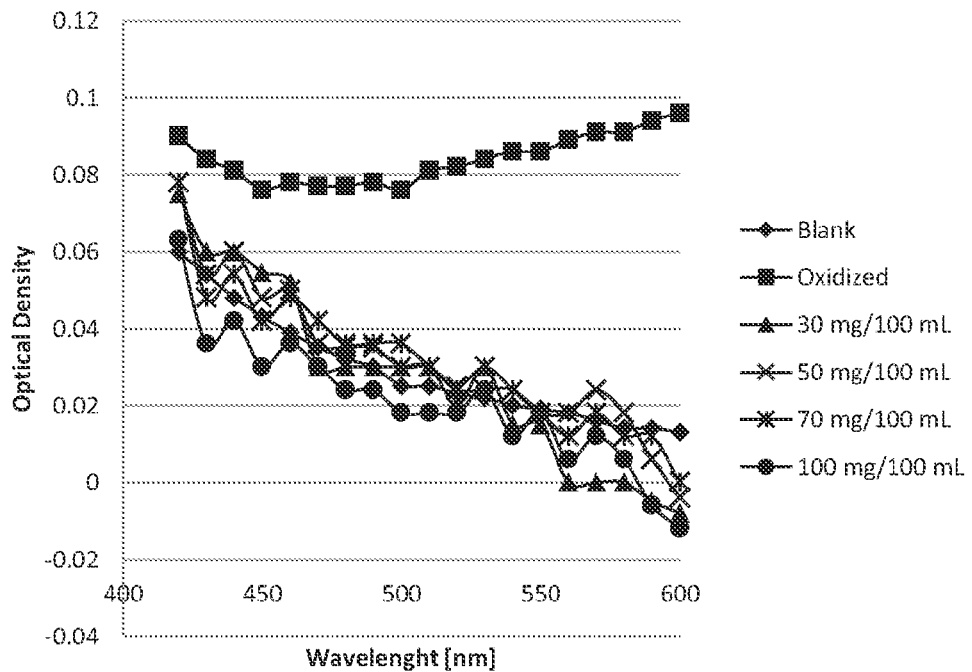
FIG. 18. Vis-spectra of remediative treatments with PANI-ES.

Similar results were observed when performing preventive treatment with PANI-ES (FIG. 18). It is observed that PANI polymers are more efficient than PVPP. The observed behavior in remedial treatments is similar to that obtained for preventive treatment.

Higher PVPP doses are needed, above 50 mg/100 mL to obtain the same results as in the case of PANI polymers.

The unique properties of PANI materials, in terms of ease of synthesis, insolubility in aqueous solutions, and high stability makes it an alternative to consider in the wine industry. They are found to be more efficient in controlling pinking in white wines, both preventively as remedial. They are an alternative to PVPP as fining agent. Moreover, use of PANI materials in food matrices has been little explored, and their applications look promising.

What is claimed is:

1. A method for removing phenolic compounds from a food or beverage, comprising contacting the food or beverage with a fining agent selected from the group of polymers consisting of: polyaniline (PANI), polyaniline emeraldine base (PANI-EB) and polyaniline emeraldine salt (PANI-ES) polymers, wherein the fining agent removes the phenolic compounds.

2. The method of claim 1, wherein the PANI, PANI-ES, or PANI-EB polymers are selected in a range of molecular weight from 7 kDa to 150 kDa.

3. The method of claim 1, wherein the PANI, PANI-ES, or PANI-EB polymers are selected in a range of molecular weight from 15 kDa to 70 kDa.

4. A method for the removal of phenolic compounds from a food or beverage, comprising contacting the food or beverage with a fining agent selected from the group of polymers consisting of: polyamidoamine (PAMAM) dendrimers functionalized with polyaniline (PANI), polyaniline emeraldine base (PANI-EB) and polyaniline emeraldine salt (PANI-ES) polymers, wherein the fining agent removes the phenolic compounds.

5. The method of claim 4, wherein the generation of the PAMAM dendrimer is selected among generation 0, 1, 2, 3, 4, 5, 6, or 7.

6. The method of claim 4, wherein the PAMAM dendrimers are functionalized with PANI, PANI-ES, or PANI-EB polymers having a range of molecular weight from 7 kDa to 150 kDa.

7. The method of claim 4, wherein the PAMAM dendrimers are functionalized with PANI, PANI-ES, or PANI-EB polymers having a range of molecular weight from 15 kDa to 70 kDa.

8. The method of claim 4, wherein the polymer is added to the food or beverage in a ratio of 0.3 g/l to 0.7 g/l, and further comprises a step of agitating the food or beverage for a period of time between 1 and 2 hours.

9. The method of claim 1, wherein the polymer is immobilized in a matrix for continuous mode use.

10. The method of claim 9, wherein the matrix is a prefilter.

11. The method of claim 9, wherein the matrix is a set of magnetic particles.

12. The method of claim 9, wherein the matrix is a cartridge.

13. The method of claim 1, wherein the food or beverage is selected from the group consisting of: juice, a fermented alcoholic beverage, and a distilled alcoholic beverage.

14. The method of claim 13, wherein the fermented alcoholic beverage is selected from the group consisting of: wine, beer, and pulque.

15. The method of claim 13, wherein the distilled alcoholic beverage is selected from the group of aguardientes consisting of whisky, vodka, brandy, vermouth, arak, ouzo, pastis, sambuca, rum, cachaça, tequila, and mezcal.

* * * * *